(12) United States Patent
Findley

(10) Patent No.: US 6,714,919 B1
(45) Date of Patent: *Mar. 30, 2004

(54) DEVICE FOR SELECTIVELY BLOCKING REMOTE PURCHASE REQUESTS

(75) Inventor: Thomas A. Findley, Portland, OR (US)

(73) Assignee: Network Sciences Company, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/513,608

(22) Filed: Feb. 25, 2000

Related U.S. Application Data

(62) Division of application No. 09/017,403, filed on Feb. 2, 1998, now Pat. No. 6,108,642.

(51) Int. Cl.$^7$ .............................................. G06F 17/60
(52) U.S. Cl. ........................................ 705/44; 705/26
(58) Field of Search .............................. 705/26, 44, 75; 235/380

(56) References Cited

U.S. PATENT DOCUMENTS

| | | | |
|---|---|---|---|
| 3,719,927 A | 3/1973 | Michels et al. ............... 340/5.4 |
| 3,854,007 A | 12/1974 | Hatton ........................ 370/294 |
| 5,243,174 A | 9/1993 | Veeneman et al. .......... 235/381 |
| 5,309,501 A | 5/1994 | Kozik et al. ................. 455/410 |
| 5,311,594 A | 5/1994 | Penzias ....................... 713/183 |
| 5,335,278 A | 8/1994 | Matchett et al. ............. 380/248 |
| 5,420,910 A | 5/1995 | Rudokas et al. ............. 455/410 |
| 5,530,438 A | 6/1996 | Bickham et al. ............. 340/5.8 |
| 5,555,551 A | 9/1996 | Rudokas et al. ............. 455/410 |
| 5,566,234 A | 10/1996 | Reed et al. .................. 379/188 |
| 5,606,604 A | 2/1997 | Rosenblatt et al. ......... 379/198 |
| 5,615,110 A | 3/1997 | Wong .......................... 705/38 |
| 5,638,430 A | 6/1997 | Hogan et al. .......... 379/114.14 |
| 5,652,786 A | 7/1997 | Rogers ..................... 379/91.01 |
| 5,657,389 A | 8/1997 | Houvener .................... 713/186 |
| 5,724,424 A * | 3/1998 | Gifford ........................ 705/79 |
| 5,781,632 A | 7/1998 | Odom .......................... 705/78 |
| 5,862,220 A * | 1/1999 | Perlman ...................... 713/162 |
| 5,884,289 A | 3/1999 | Anderson et al. ............. 705/44 |
| 5,903,878 A | 5/1999 | Talati et al. .................. 705/26 |
| 5,917,893 A | 6/1999 | Katz ........................ 379/93.02 |

(List continued on next page.)

FOREIGN PATENT DOCUMENTS

JP   4-07-262 455 A   * 10/1995

OTHER PUBLICATIONS

Schwartz, L., et al., "50 Simple Precautions Help Retailers Protect against Credit Card Fraud," Merchandising, vol. 10, p. 54, Dec., 1985.*

(List continued on next page.)

*Primary Examiner*—Nicholas David Rosen
(74) *Attorney, Agent, or Firm*—Law Office of Timothy E. Siegel; Timothy E. Siegel

(57) ABSTRACT

A method for selectively blocking a remote purchase request based on previous remote purchase requests. The method starts with receiving and storing, in a memory subsystem, information from purchase request information sets including, for each purchase request information set, an origin, a card number and an item. Also, a current remote purchase request information set including an origin, a credit card number and an item is received and stored. The current remote purchase request information set is compared with the stored information sets and the current remote purchase request is blocked if the comparison meets any one of a predetermined set of criteria wherein at least one criterion includes a condition that the purchase request origin of the current purchase request match a purchase request origin of a purchase request information set stored in the memory subsystem, for which the card number is different.

4 Claims, 3 Drawing Sheets

U.S. PATENT DOCUMENTS

| | | | | | |
|---|---|---|---|---|---|
| 5,996,076 | A | * | 11/1999 | Rowney et al. | 713/201 |
| 6,018,724 | A | * | 1/2000 | Arent | 705/44 |
| 6,029,154 | A | * | 2/2000 | Pettitt | 705/44 |
| 6,085,976 | A | * | 7/2000 | Sehr | 235/384 |
| 6,092,057 | A | * | 7/2000 | Zimmerman et al. | 705/44 |
| 6,095,413 | A | * | 8/2000 | Tetro et al. | 235/380 |
| 6,466,780 | B1 | * | 10/2002 | Geiselman et al. | 455/411 |
| 6,529,725 | B1 | * | 3/2003 | Joao et al. | 455/406 |
| 2002/0035543 | A1 | * | 3/2002 | Shedd et al. | 705/44 |

OTHER PUBLICATIONS

Schwartz, L., et al. "Surviving the Chargeback Rule," Direct MArketing, vol. 54, No. 8, pp. 23–24, Dec. 1991.*

Borenstein, N.S., "Perils and Pitfalls of Practical Cybercommerce," Communications of the ACM, vol. 39, No. 6, pp. 36–44, Jun. 1996.*

DeFranco, L., "Paper or Plastic," Florist, vol. 31, p. 49, Sep. 1, 1997.*

* cited by examiner

DEVICE FOR SELECTIVELY BLOCKING REMOTE PURCHASE REQUESTS

RELATED APPLICATION

This application is a divisional of application Ser. No. 09/017,403, Feb. 2, 1998, now U.S. Pat. No. 6,108,642, issued Aug. 22, 2000.

BACKGROUND OF THE INVENTION

Merchants who sell goods on credit over the telephone or the internet ("remote sale merchants") encounter the difficult problem of credit card fraud. Unlike a merchant selling goods on credit in the physical presence of the purchasers, a remote sale merchant does not have an opportunity to inspect the signature of the purchaser or to compare a photo ID card with the purchaser's actual appearance.

Typically, a remote sale merchant employs a computer system having terminals or "voice response units," each of which is connected with a telephone line and is controlled by an operator wearing the commonly familiar telephone headset and receiving telephone calls. Each operator typically answers the telephone and receives purchase request information from the caller that includes the merchandise that the caller wishes to purchase, the person and address to which the merchandise should be delivered, the name of the person making the purchase and a credit or debit card number to which the purchase should be charged. (As used in this application the term "card number" refers to any charge authorizing number including debit card numbers, credit card numbers, or a charge authorizing number that is not shown on any card.) The operator enters this information into the terminal and presses a keyboard button which causes the computer system to send an authorization query to the card issuing financial institution. The decision to authorize is typically based on whether the number is legitimate, adequate funds are available in the account, and the card holder is current on his or her payments. If the card issuing financial institution declines the charge, the caller is told that the purchase cannot be made. If the financial institution accepts, a charge to the card number account is initiated and the purchase and shipping address information is automatically forwarded to the shipping department which fills the order. Optionally, the financial institution may offer an address verification service (AVS). To utilize this service the remote purchase merchant transmits the shipping address or zip code to the financial institution, which responds with a flag indicating whether or not the address and/or zip code matches the billing address on file.

Another computer system for effecting remote purchases is a computer system for enabling parties to purchase items over the internet or from a computer connected by modem to the computer system. In such a computer system, the party making a purchase request enters his or her credit card number and a descriptor or descriptors of the merchandise to be purchased into a remote terminal that is connected by way of the internet or a telephone line to the computer system. Again, the computer system generates an authorization query to the card issuing financial institution and contacts the shipping department to fill the order if the purchase is authorized.

Unfortunately, there is sometimes a considerable time interval between the time a credit card is stolen and the time when the theft of the card is reported to the card issuing financial institution. Moreover, the notation and illicit use of a credit card number by a dishonest store clerk or other person able to observe the number is likely to be completely undetected until the number is used fraudulently and the card holder receives his or her statement.

When a cardholder does receive a statement bearing fraudulent charges, he or she is likely to quickly disavow the purchases. In these cases the card issuing financial institution typically will ask the merchant to corroborate the purchase with a copy of a signed credit card receipt. For the case of a remote purchase, the merchant will not be able to produce a signed receipt. In this situation the merchant is forced to accept a "charge back" and to return the funds to the card issuing institution.

Credit card fraud varies from casual fraud by the occasionally dishonest and adventurous to sophisticated operations that attempt to purchase a large quantity of a particular item and to profitably reintroduce it into the stream of commerce. As systems for selling items over the internet and telephone lines become increasingly automatic, fraud systems also become more automatic. For example, it has been known for thieves to use a computer to invent credit card numbers and submit a large number of purchase requests, knowing that a portion of the invented card numbers will be for issued credit cards and hoping that some of the purchase requests will be accepted.

Despite the occurrence of fraud, the convenience and speed of using credit cards to make remote purchases is causing a continued expansion in catalog sales, advertised telephone sales and sales over the internet.

In a first separate aspect, the present invention is a computer system for processing and selectively blocking a current remote purchase request based on information gained from at least a previous remote purchase request. The system includes a data input subsystem, connected to a data line, capable of automatically receiving an origin, and of further receiving a card number and merchandise descriptor to form, in total, a purchase request information set. Also, a memory subsystem is adapted to store the purchase request information set and a logic subsystem is adapted to effect a comparison of the purchase request information set of the current remote purchase request with the purchase request information set of at least one of the previous remote purchase requests. Further, the logic subsystem is adapted to cause the current remote purchase request to be blocked if the comparison meets any one of a predetermined set of criteria wherein at least one criterion includes a condition that the purchase request origin of the current purchase match the purchase request origin of the previous purchase request.

In a second separate aspect, the present invention is a method for selectively blocking a second remote purchase request based on information gained from at least a first remote purchase request. The method includes the act of receiving and storing a first purchase request information set including an origin, a credit card number and an item and also receiving and storing a second remote purchase request information set including an origin, a credit card number and an item. The second remote purchase request information set with the first remote purchase request information set and blocking the second remote purchase request if the comparison meets any one of a predetermined set of criteria wherein at least one criterion includes a condition that the purchase request origin of the first purchase request match the purchase request origin of the second purchase request.

In a third separate aspect, the present invention is a method for selectively blocking a remote purchase request based on information gained from previous remote purchase requests. The method starts with the act of providing a memory subsystem and receiving and storing, in the memory subsystem, information from purchase request information sets including, for each purchase request information set, an origin, a card number and an item. In addition a current remote purchase request information set including an origin, a credit card number and an item is received and stored. Then the current remote purchase request information set is compared with the purchase request information sets stored in the memory subsystem and the current remote purchase request is blocked if the comparison meets any one of a predetermined set of criteria wherein at least one criterion includes a condition that the purchase request origin of the current purchase request match a purchase request origin of a purchase request information set stored in the memory subsystem, for which the card number is different.

DETAILED DESCRIPTION OF THE PREFERRED EMBODIMENTS

Figure 1:
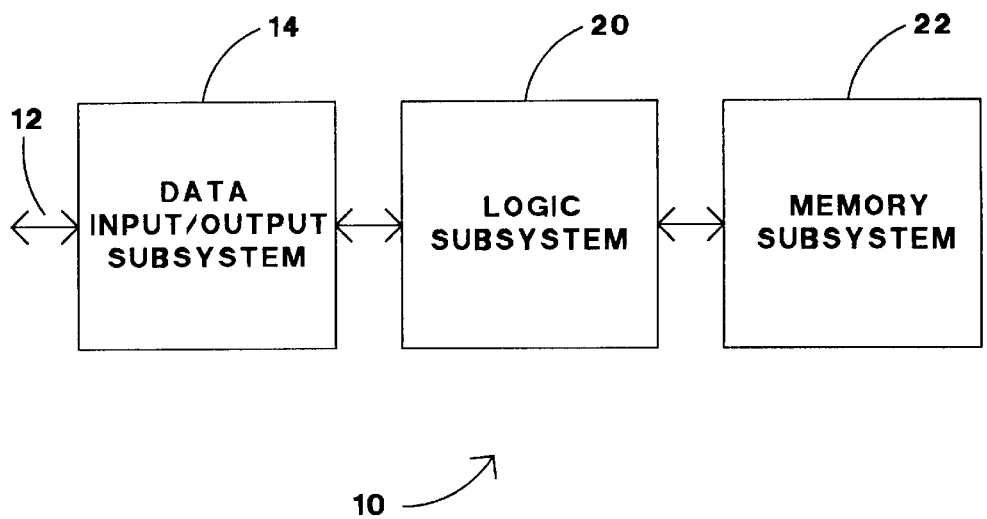
FIG. 1 is a block diagram of a remote purchase processing computer system according to the present invention.
Figure 2A:
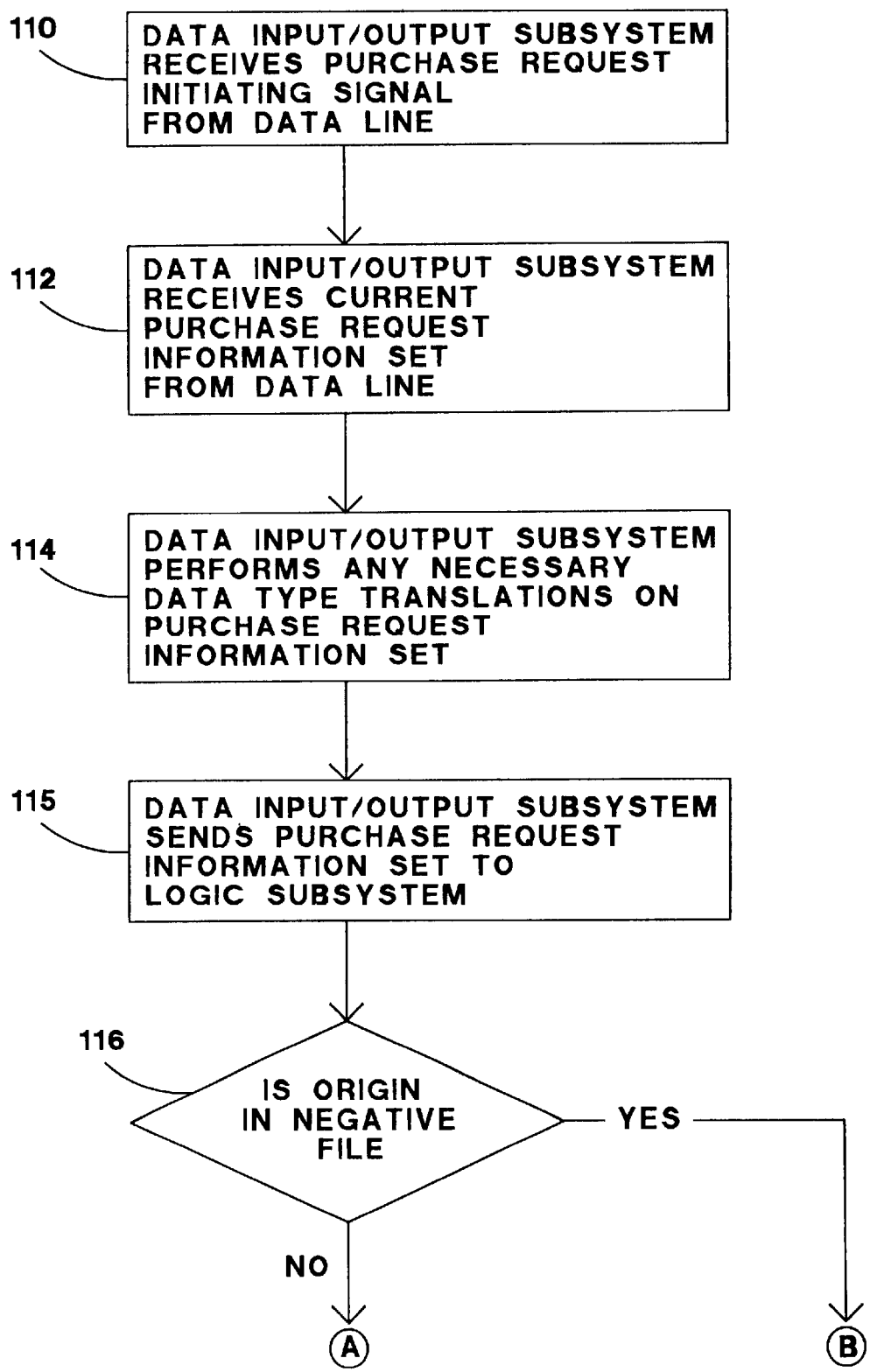
FIG. 2A is a flow chart of the beginning part of the logic process implemented in the system of FIG. 1.

A preferred embodiment of the present invention comprises a remote purchase processing computer system 10 that is connected to a data line 12, over which it receives a remote purchase request initiating signal (block 110 in FIG. 2a). In one preferred embodiment, data line 12 is a telephone line. In this instance, the purchase request initiating signal (block 110) would be a ring signal received over the telephone line. A data input subsystem 14 answers the ring signal, in a manner familiar to those skilled in the art of telephony, and automatically receives a caller ID signal describing the telephone number of the calling station (block 112). In many systems 10, data input subsystem 14 includes a human operator or operators who query the callers, hear the purchase request information (block 112) and translate the auditory purchase request information into a set of keystrokes (block 114) that are input into system 10 via a terminal keyboard. It is becoming increasingly common, however, to avoid the necessity of employing a human operator by allowing the caller to enter all of the information by way of a telephone keypad. A dual tone modulated frequency translation system is used to translate information (block 114) that the purchase requester inputs into the telephone keypad. For those who are calling by way of their own computer/modem system, data input system 14 would include a modem for collecting all of the purchase information set.

Alternatively, data line 12 could be a direct connection to the internet or some other computer network. In this embodiment, computer system 10 receives the internet address of the purchase request information over data line 12 and subsystem 14 does not employ a human operator.

In any one of the embodiments, each assembled purchase request information set is sent (block 115) to a logic subsystem 20. Logic subsystem 20 compares the purchase request information set to information stored in a memory subsystem 22. The bulk of the information in memory subsystem 22 typically will have been gathered from previous purchase requests. Even if there are many terminals in data input subsystem 14 all of the information sets are cataloged together in memory subsystem 22 so that a more effective data bank is constructed. Information in memory subsystem 22, however, may also have been gathered from other sources. For example, a merchant may decide to not authorize purchase requests from telephone calls originating from jails and prisons. Therefore, all of the telephone numbers for telephones in jails and prisons are kept in a "negative file" of origins that will result in automatic rejection when detected (decision box 116 of FIG. 2A). Optionally, when the remote merchant determines that an origin has generated a fraudulent purchase, the fraudulent purchase generating origin is also entered into the negative file (typically this is done manually by a keyboard operator).

In one preferred embodiment, "history factors" are computed for both card numbers and origins so that the algorithm can take into account the legitimate purchase history of both the purchase request origin and card number. A purchase request from an origin or card number that has been used to make legitimate purchases from the merchant in the past is less likely to be fraudulent then a call from a origin or card number encountered for the first time. Although it is possible that a thief who has just acquired a stolen card number will make a remote purchase request to a merchant that the legitimate card holder purchased from in the past, it is more likely that the thief will have different tastes and seek to purchase from different merchants to whom the stolen card number and the thief's origin will be new.

Equations 1, 2 and 3 given below show the calculation of these factors. For residences:

$$OHF = 1 + 0.001 \times \sum^{P} (D \times \text{Min}[N \quad 10]) \qquad (1)$$

where OHF=origin history factor,
D=dollar purchase amount,
N=number of months since date of purchase, and
P=all same origin no fraud indication purchases more than 1 month old.

$$\text{Public and semi-public telephone, OHF}=0.2 \qquad (2)$$

$$CNHF=1+0.001\times\Sigma(D\times\text{Min}[N, 10]) \qquad (3)$$

where CNHF=card number history factor,
D=dollar purchase amount,
N=number of months since date of purchase, and purchase request history factor=Max (CNHF, OHF)
P=all the same card number no fraud indication purchases more than 1 month old.

Figure 2B:
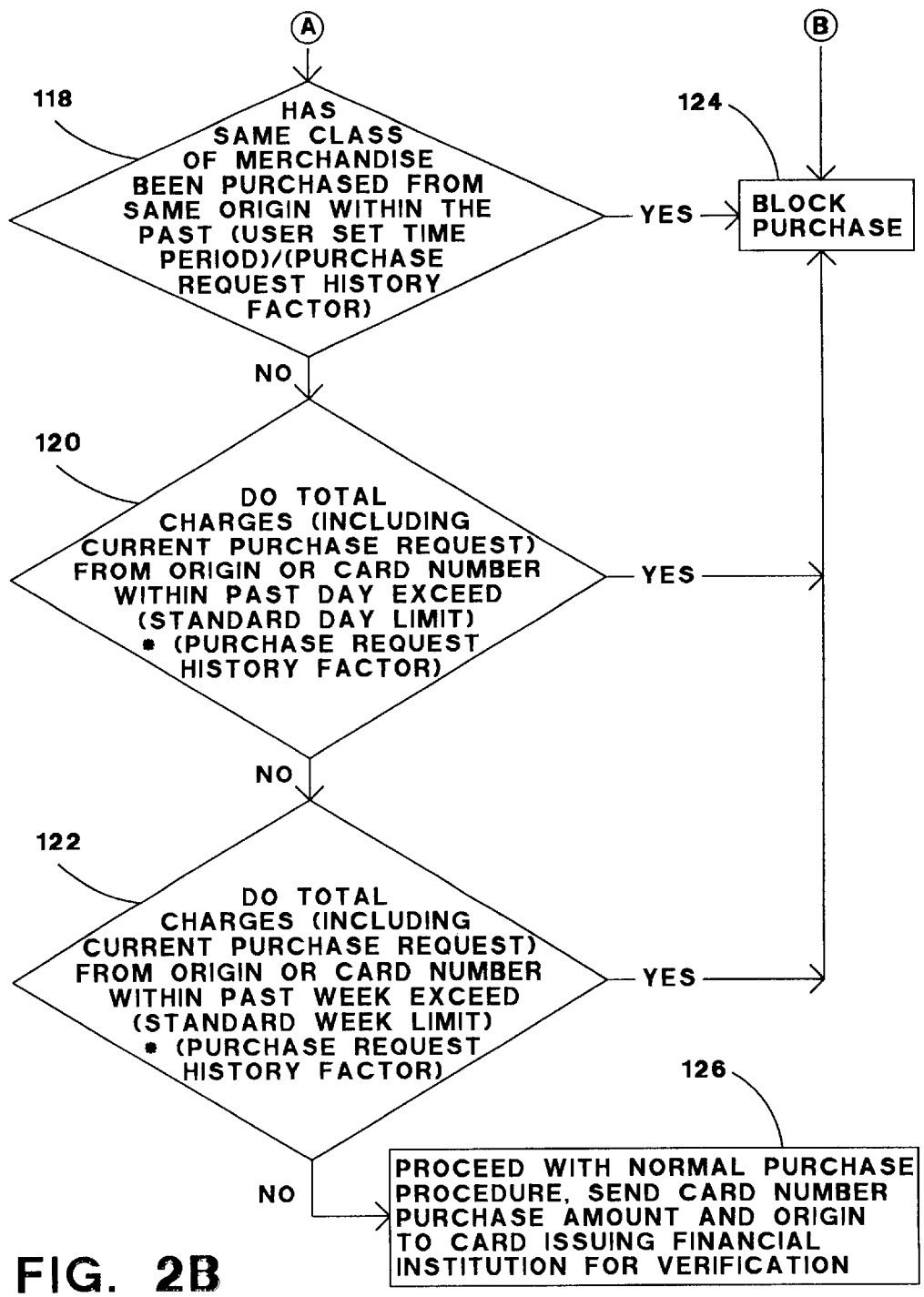
FIG. 2B is a flow chart of the end part of the logic process implemented in the system of FIG. 1.

The history factors are used to determine the amount of purchases which are allowed over a particular time period as shown in decision boxes 118, 120 and 122 in FIG. 2B. The longer a purchase is outstanding without being detected as fraudulent, the greater the probability that the purchase was, indeed, legitimate. For the first one month period, of course, little confidence can be had in the purchase, because there is no guarantee that the card holder has been billed for the purchase. Therefore, purchases less than one month old are not counted. After that the purchases are given greater weight as they age, until at ten months, when there is little chance of undetected fraud yet being detected, they reach their maximum weight.

Purchase requests from public and semi-public telephone numbers such as numbers originating from motels and pay telephones are given an origin history factor of 0.2, because no meaningful history can be compiled (equation 2). Also, a person wishing to commit remote purchase fraud is likely to use a telephone which cannot be traced to his or her home address, where he or she is more likely to be identified. Therefore, telephone calls originating from public or semi-public telephones are more likely to originate fraudulent calls.

Next, an inquiry is made into whether or not an item in the same merchant-defined merchandise category has been purchased within the previous merchant set time period divided by the purchase request history factor (decision box 118). Sophisticated remote purchase thieves may try to steal a sizable quantity of a particular product because it is easier to illicitly reintroduce a set of uniform items back into the stream of commerce than to do the same for an eclectic mix. For example, a ring of thieves may attempt to steal 1,000 handbags of a particular popular make. By having a safeguard such as that in block 118 the merchant limits its exposure to repetitive theft from the same merchandise category.

Decision boxes 120 and 122 place limits on the monetary value of a days purchase and a weeks purchase from the same origin. This enables a merchant to limit its exposure to fraud. In particular, this addresses the case in which a thief has compiled a quantity of credit card numbers and is calling from the same origin, but using a different card number each time to avoid any limits placed on each card number. If a merchant prefers, time periods other than a day or a week may be chosen.

If the test results of decision boxes 118, 120 or 122 are positive, then the purchase is automatically blocked (block 124) and the case of an operator controlled terminal, the key which causes a query to be sent to a financial institution is disabled. Together, boxes 118, 120 and 122 comprise a set of criteria, any criterion of which could cause the purchase request to be blocked, if satisfied in the negative. The term "set of criteria," as used in this application, may include as few as one criterion only.

If the purchase is tentatively authorized in decision box 122, the origin, card number and purchase amount, and other data as required are sent to the card issuing financial institution for verification (block 126). If the financial institution has no origin verification service, then the sending of the origin may be omitted. The financial institution that does have an origin verification service will send back a signal indicating whether or not the origin matches any origin that it has on file for that card number. If any of the tests of boxes 118, 120 or 122 were "near misses," for example if the time since the last purchase of the same category of merchandise (box 118) was not much greater than the (user set time period)/(purchase request history factor), then a bit would be set that would cause the purchase request to be denied if the origin verification was returned in the negative. The user may be queried to supply his home telephone number, so that the origin sent to the card issuing financial institution for verification will more likely be the one on file.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for selectively blocking a remote purchase request based on information gained from previous remote purchase requests, comprising:
    (a) providing a memory subsystem;
    (b) receiving and storing, in said memory subsystem, information from purchase request information sets including, for each purchase request information set, an origin, a card number and an item;
    (c) receiving and storing a current remote purchase request information set including an origin, a credit card number and an item;
    (d) comparing said current remote purchase request information set with said purchase request information sets stored in said memory subsystem and blocking said current remote purchase request if said comparison meets any one of a predetermined set of criteria wherein at least one criterion includes a condition that said purchase request origin of said current purchase request match a purchase request origin of a purchase request information set stored in said memory subsystem, for which said card number is different.

2. The method of claim 1 wherein said current purchase request origin is an Internet address from which said purchase request is being made.

3. The method of claim 1 wherein said current purchase request origin is the telephone number of a telephone station from which said purchase request is being made.

4. The method of claim 1 wherein said predetermined set of criteria includes a criterion placing a limit on the monetary value of purchases permitted to any single origin within a predetermined time period and a higher limit is placed on origins with a history of apparently non-fraudulent purchases.

* * * * *

UNITED STATES PATENT AND TRADEMARK OFFICE
CERTIFICATE OF CORRECTION

PATENT NO. : 6,714,919 B1
DATED : March 30, 2004
INVENTOR(S) : Thomas A. Findley It is certified that error appears in the above-identified patent and that said Letters Patent is hereby corrected as shown below:

Column 2,
Between lines 27 and 28, before the paragraph which begins "In a first separate aspect," please add heading: -- SUMMARY OF THE INVENTION --

Signed and Sealed this

Eighteenth Day of May, 2004

JON W. DUDAS
*Acting Director of the United States Patent and Trademark Office*